United States Patent [19]

Cheung et al.

[11] Patent Number: 5,175,854
[45] Date of Patent: Dec. 29, 1992

[54] INTER-APPLICATAION INTERFACE SYSTEM

[75] Inventors: Baldwin K. Cheung, Lexington; Seth S. Cohen, Westford, both of Mass.; Neal F. Jacobson, Nashua, N.H.; Robert L. Travis, Concord, Mass.

[73] Assignee: Digital Equipment Corporation, Maynard, Mass.

[21] Appl. No.: 892,609

[22] Filed: May 29, 1992

Related U.S. Application Data

[63] Continuation of Ser. No. 368,451, Jun. 19, 1989, abandoned.

[51] Int. Cl.⁵ .................................. G06F 9/00
[52] U.S. Cl. ..................... 395/650; 364/DIG. 1; 364/231.6; 364/231.7; 364/242.5; 364/281.4; 364/284.3
[58] Field of Search ............ 395/650; 364/231.6, 364/231.7, 242.5, 281.4, 284.3

[56] References Cited

U.S. PATENT DOCUMENTS

| | | | |
|---|---|---|---|
| 4,084,228 | 4/1978 | Dufond et al. | 364/200 |
| 4,333,144 | 6/1982 | Whiteside et al. | 364/200 |
| 4,694,396 | 9/1987 | Weisshaar et al. | 364/200 X |
| 4,849,877 | 7/1989 | Bishop et al. | 364/200 |
| 4,943,932 | 6/1990 | Lark et al. | 364/513 |
| 5,067,072 | 11/1991 | Talati et al. | 395/650 |

OTHER PUBLICATIONS

Stephen Mallinson, "IBM Communications-Architectures and Directions," *Proceedings of the Int'l Conf. on Networking Technology and Architectures*, London, Jun. 1988, pp. 49-60.

*Primary Examiner*—Thomas M. Heckler
*Assistant Examiner*—Dennis M. Butler
*Attorney, Agent, or Firm*—Arnold, White & Durkee

[57] ABSTRACT

A new processing system includes a child system and a parent system. The child system performs operations in a session, and includes a child application and a child-parent interface for receiving communications from a parent to control said child application. The parent system includes a child application invocation portion for enabling a child application to be invoked, a parent-child interface for generating communication for transfer to said child-parent interface, and a parent application for controlling the child application invocation portion and said child parent interface to enable invocation of said child application and for thereafter enabling said child application to perform processing operations in a series of processing sessions.

21 Claims, 10 Drawing Sheets

INTER-APPLICATAION INTERFACE SYSTEM

This application is a continuation of application Ser. No. 07/368,451, filed Jun. 19, 1989 now abandoned.

FIELD OF THE INVENTION

The invention relates generally to the field of digital data processing systems and more particularly provides an interface arrangement for interfacing between applications to facilitate calling of applications while using other applications and transfer of data between applications.

BACKGROUND OF THE INVENTION

A typical computer system includes three basic elements, namely, a processor, a memory and an input/output system. The memory stores information, including data and instructions for processing the data, in a plurality of addressable storage locations. The processor enables information to be transferred, or fetched, to it, interprets the incoming information as either instructions or data, and processes the data in accordance with the instructions. The processor then transfers the processed data to addressed locations in the memory for storage. The input/output system also communicates with the memory and the processor in order to transfer information into the computer system and to obtain the processed data from it. Units comprising the input/output system normally operate in accordance with control information supplied to it by the processor. The control information defines the operations to be performed by the input/output units. Typical units comprising the input/output system include, for example, printers, video display terminals, and secondary information storage devices such as disk and tape storage units.

In a computer system, instructions are organized into programs. The programs are classified into systems programs and applications programs. The applications programs include such programs as, for example, word processing programs, spreadsheet programs, accounting programs, database programs and the like, which facilitate processing of an operator's data. The systems programs generally enable and schedule operations within the computer system, such as controlling and scheduling processing of the applications programs, controlling operation of the various units comprising the system such as memory and units comprising the input/output system.

Typically, applications programs are generally atomic, that is, they facilitate processing of input data to generate output data within a specific application domain. Generally, if an operator wishes to initiate processing operations outside of a particular application's domain, the user exits the one application and calls a second application for performing the processing operations required for the second domain, and, after generating the required processed data, exits the second application. Thereafter, the user may call the first application again to use the data that was processed by the second application.

SUMMARY OF THE INVENTION

The invention provides a new and improved system for facilitating calling a second "child" application from within a first "parent" application, enabling the child application to perform, in one or more processing sessions, processing operations on data to generate processed data which may be used by the parent application.

In brief summary, the new processing system includes a child system and a parent system. The child system performs operations in a session, and includes a child application and a child-parent interface for receiving communications from a parent to control said child application. The parent system includes a child application invocation portion for enabling a child application to be invoked, a parent-child interface for generating communication for transfer to said child-parent interface, and a parent application for controlling the child application invocation portion and said child parent interface to enable invocation of said child application and for thereafter enabling said child application to perform processing operations in a series of processing sessions.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
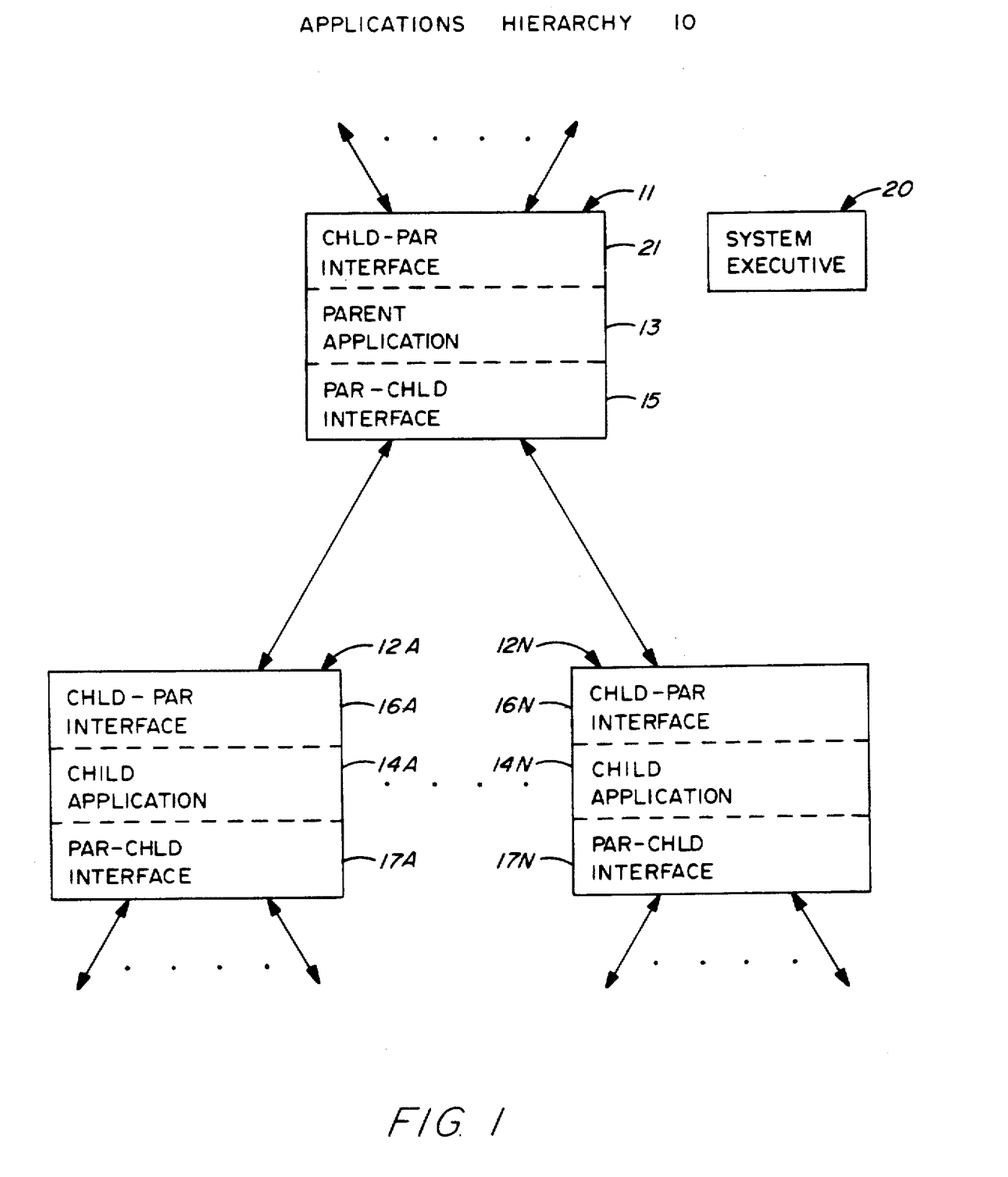
FIG. 1 is a functional block diagram depicting hierarchically-organized applications programs including the inter-application interface constructed in accordance with the invention.

FIG. 1 is a functional block diagram depicting hierarchically-organized applications programs which incorporate the invention. With reference to FIG. 1, an applications hierarchy 10 includes a parent 11 and one or more children 12A through 12N (generally identified by reference numeral 12). The parent 11 includes a parent application program 13 and each child 12 includes a child application, generally identified by reference numeral 14. It will be appreciated that the hierarchy 10 may include a plurality of levels, such that each child 12 depicted in the applications hierarchy 10 in FIG. 1 may also comprise a parent relative to other children.

The parent 11 also includes a parent-child interface 15, and each child 12 also includes a child-parent interface, generally identified by reference numeral 16, that jointly facilitate communication between the parent application 13 and the respective child applications 14. The parent-child interface 15 and child-parent interface 16, along with a communications mechanism provided by the computer system processing the parent application 13, child application 14, parent-child interface 15 and child-parent interface 16, thus effectively form an inter-application interface between the parent application 13 and child application 14. More specifically, the parent 11, and specifically the parent application 13, uses the parent-child interface 15 to initiate a call to start up the child application 14 of a child 12. If the child application 14 is not then in execution, the call is received by a system executive 20, which functions as an operating system, and which, in turn, invokes the requested child application 14 and initiates processing by it.

After processing of the child application 14 is initiated, the parent application 13 and the child application 14 operate in one or more sessions. During a session, the parent application 13, through its parent-child interface 15, provides data and commands to the child application 14, and the child application in turn receives the data and commands through its child-parent interface 16. The child application 14 processes the data and commands and supplies processed data to the parent application 13 through its child-parent interface 16, which terminates the session. The parent application 13 receives the processed data through its parent-child interface 15. These operations may be repeated by the parent application 13 and child application during subsequent sessions, so that the parent application 13 may iteratively request processing operations by the child application 14, without requiring the child application 14 to be terminated and again revoked between sessions. After termination of a session, the system executive 20 may maintain the child application's process context in a suspended condition, and may recall the child application 14 if requested by the parent application.

At some point, the parent application 13 may, either in response to a command from an operator or otherwise, determine that it no longer needs the child application 14, and it may issue a command to the child application 14 to terminate. At that point, the child application 20 terminates operation.

Figure 2A:
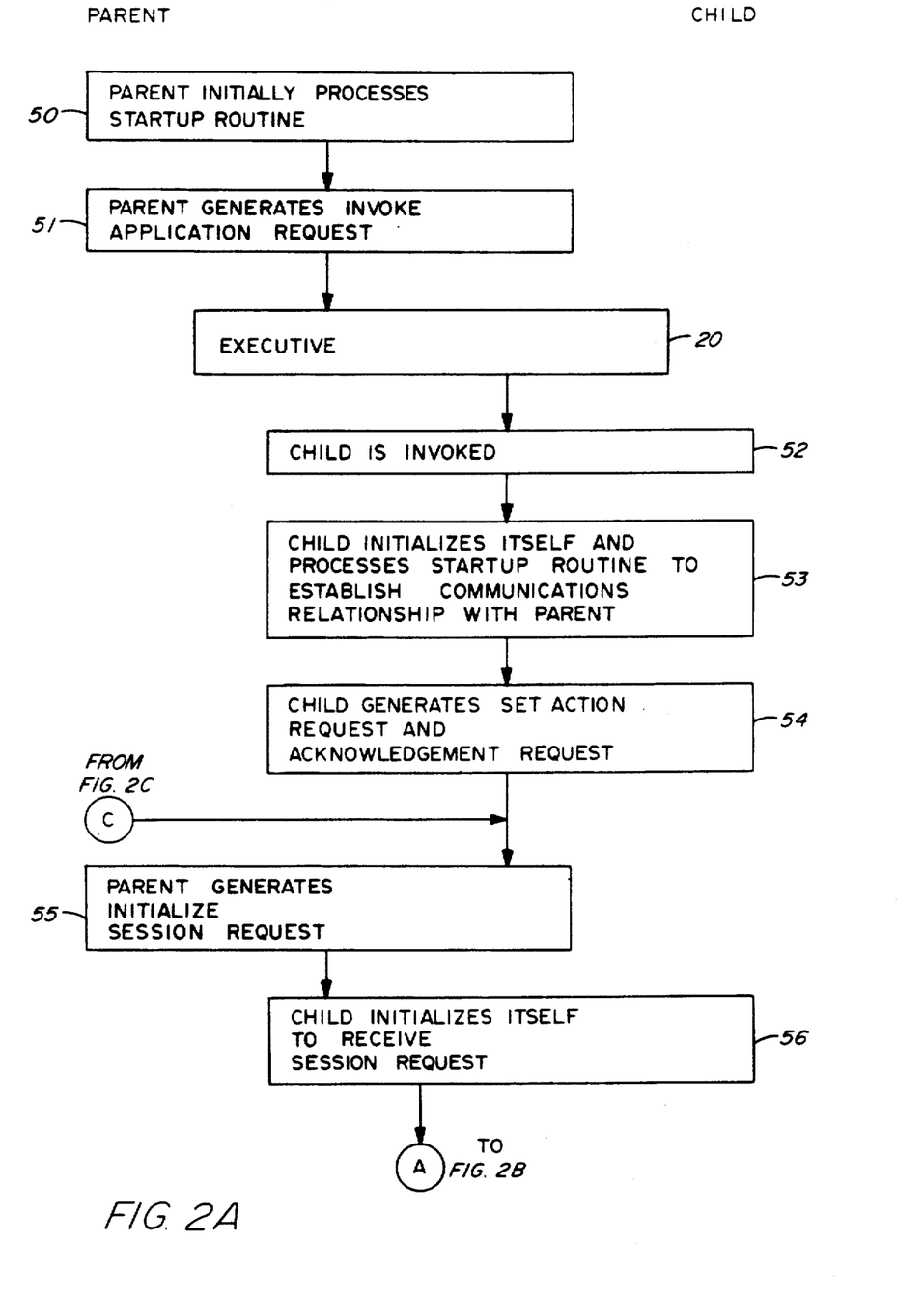
FIGS. 2A through 2C depict the general operations of a parent application and a child application in connection with the inter-application interface constructed in accordance with the invention.
Figure 2B:
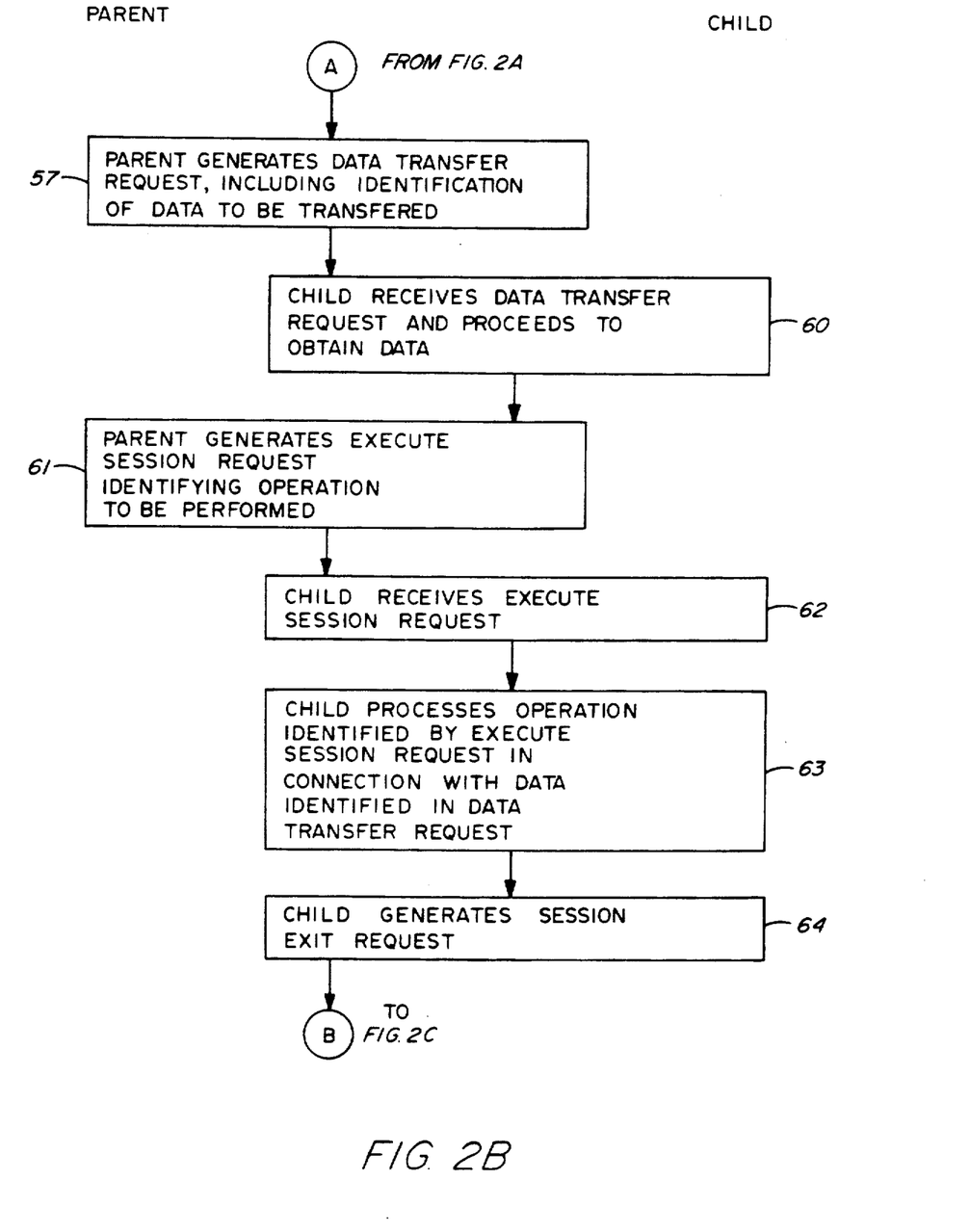
Figure 2C:
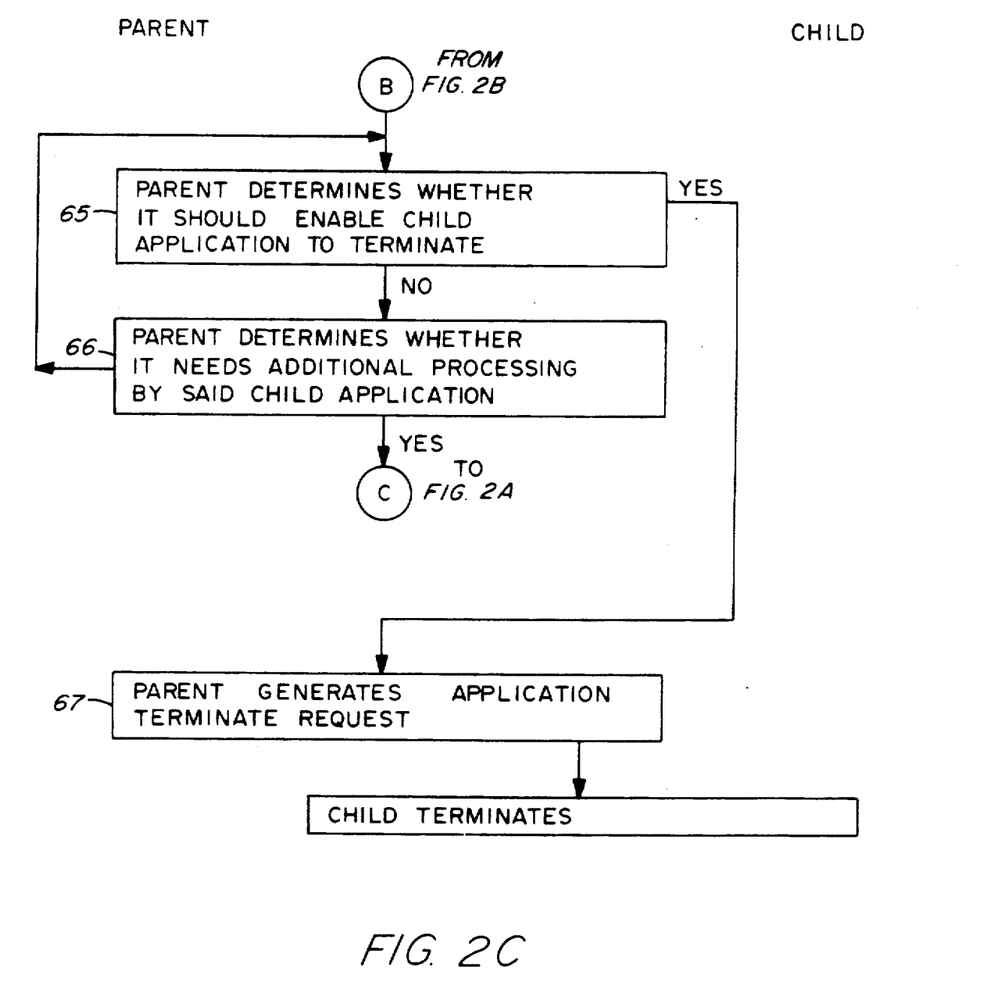
Figure 3A:
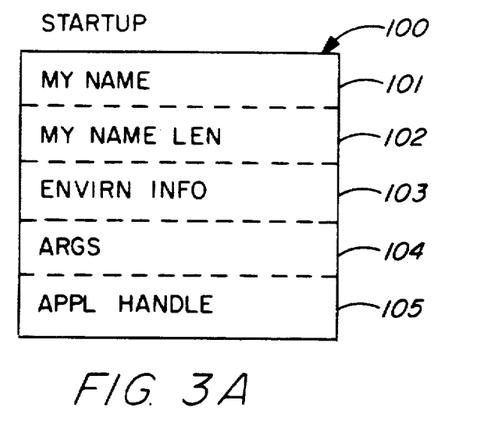
FIGS. 3A through 3S depict request formats used by the parent application and child application for initiating operations by the inter-application interface.
Figure 3B:
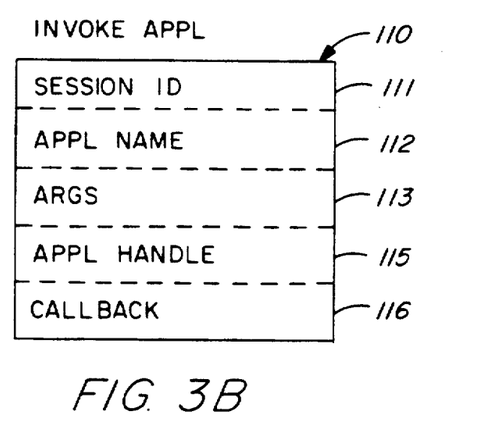
Figure 3C:
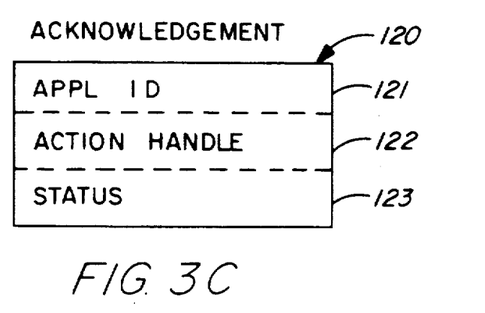
Figure 3D:
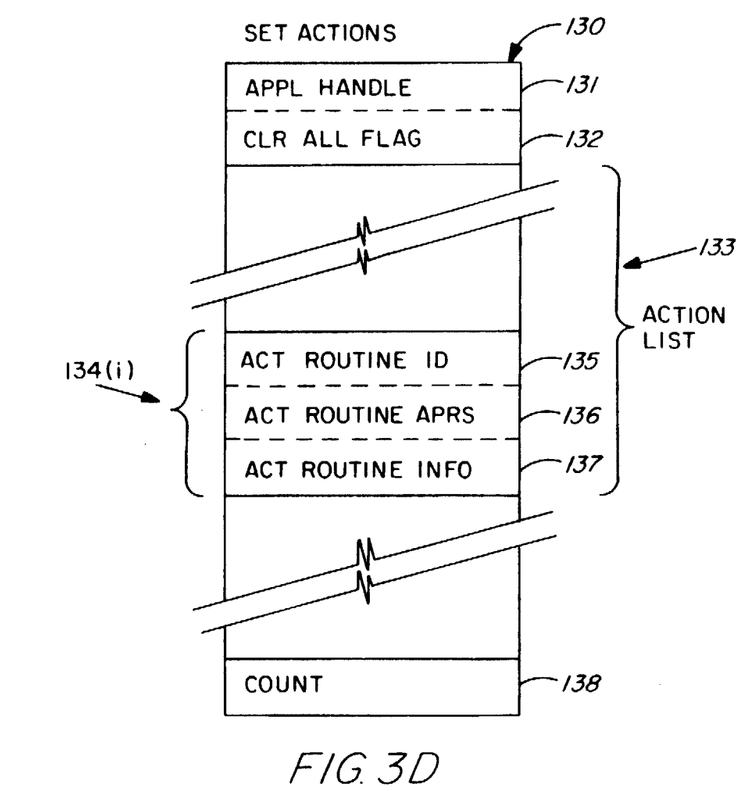
Figure 3E:
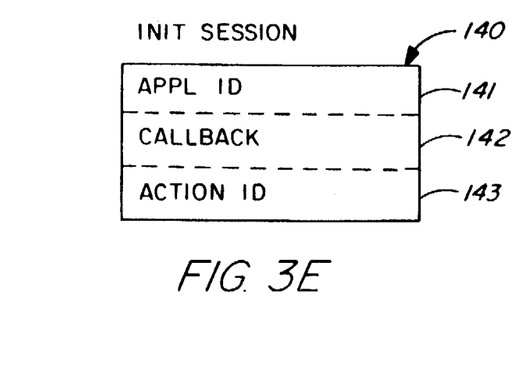
Figure 3F:
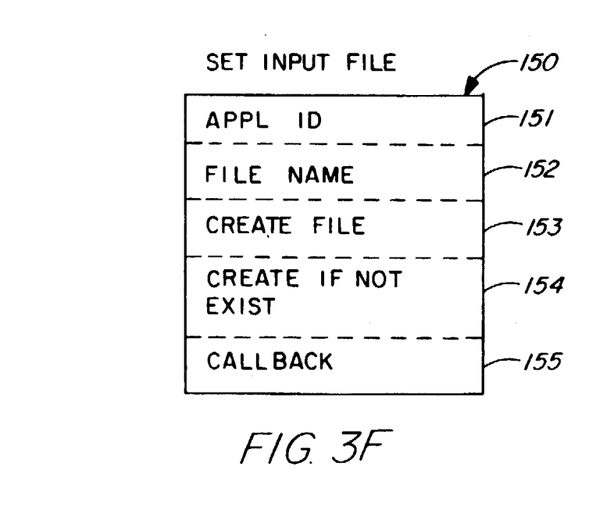
Figure 3G:
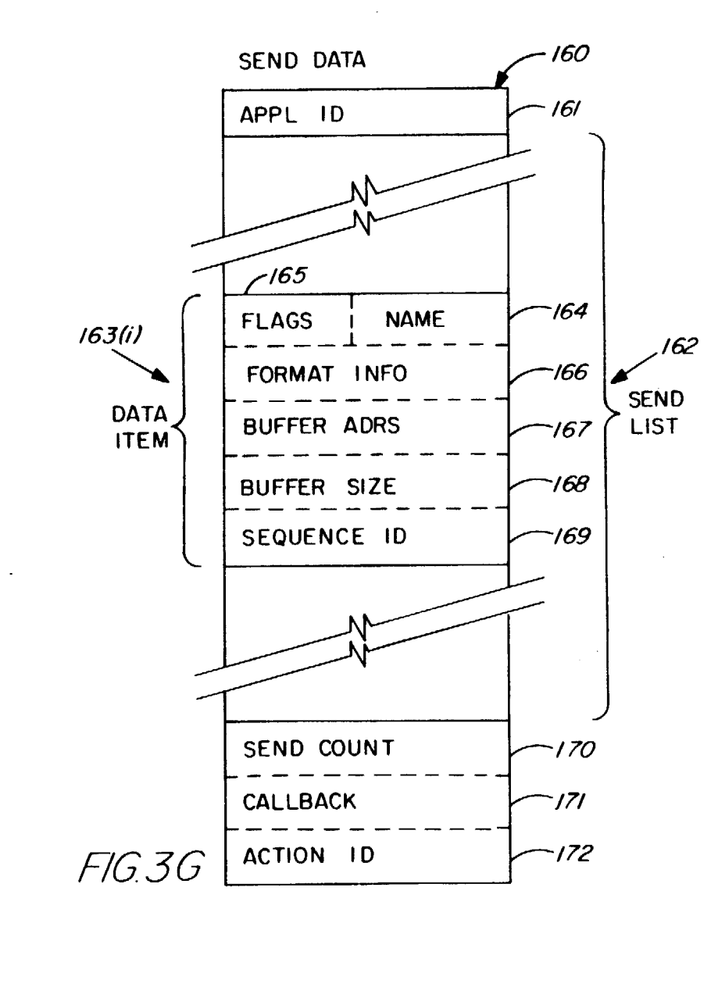
Figure 3H:
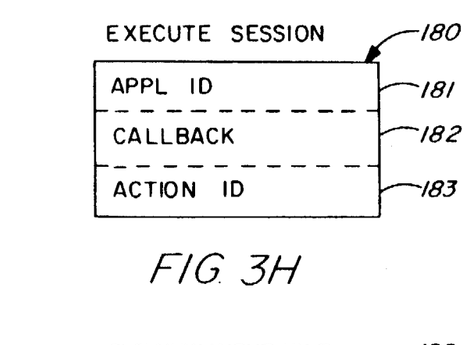
Figure 3I:
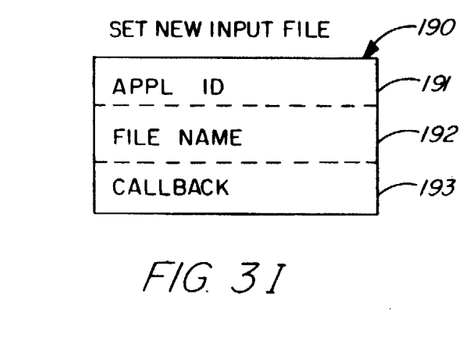
Figure 3J:
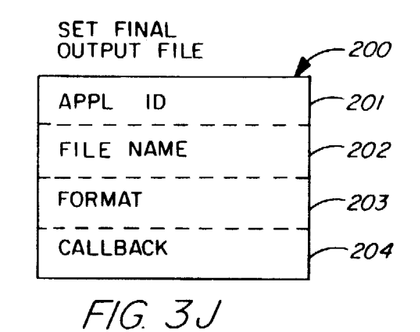
Figure 3K:
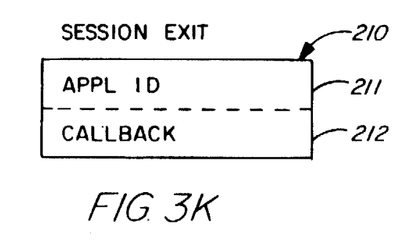
Figure 3L:
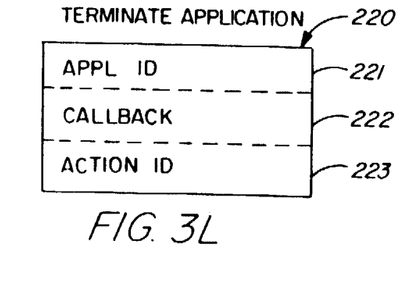

The details of communications between the parent 11 and child 12 will be described in connection with FIGS. 2A through 2C and the structures of the requests as set forth in FIGS. 3A through 3S. Preliminarily, the parent application 13 has already been invoked, that is, it is already being processed by the particular computer system in which the hierarchy 10 may be resident. The parent application 13 may have been invoked directly by an operator, or it may have been invoked by another application, which is another application (not shown) comprising a parent relative to the parent application 13. At some point after being invoked and prior to initiating operations with a child application 14, the parent application 13 issues a startup request 100 (FIG. 3A) to its parent-child interface 15 to initialize both its parent-child interface 15 and its child-parent interface 21.

In initiating processing of the startup routine, the parent application 13 passes to its child-parent interface 21 and parent-child interface 15 information that facilitates communication through its parent child interface 15 and child-parent interface 21. For example, the parent application 13 provides its identification in fields 101 and 102 of startup request 100, and other calling information to facilitate correct transfer of messages in response to requests that it might generate. In the startup request 100 (FIG. 3A), the parent application provides selected user interface control information in field 103 and selected calling arguments in field 104.

On return from processing the startup request, the parent-child interface 15 and child-parent interface 16 provide an application handle value in field 105, which indicates whether the parent application was invoked directly by an operator, or as a child application of another, relative parent, application. If the application handle value identifies that the parent application was invoked as a child application of another, relative parent, application, the application handle value that is used to identify the communications link to the relative parent application. In addition, the interfaces provide a session handle, which the parent application 13 may uses in subsequent requests.

After being invoked and following processing of its startup request, the parent application 13 may request processing from a, relative child, application. This may occur in response, for example, to a command input by an operator or another source, such as from a relative parent application (not shown). When that occurs, the parent application 13, using the parent-child interface 15, generates an invoke application request 110 (FIG. 3B). In the invoke application request 110, the parent application 13 provides the session handle in field 111 that it received in field 105 as the response to the startup request. In addition, the parent application identifies in field 112 the application to be called as the child application 14, and may specify additional information in field 113 identifying arguments to be used in calling the application. Specifically, the parent application 13 may supply, in field 112, a name identifying the file, in the digital data processing system containing the hierarchy 10, of the child application's image, and in field 113 parameters to be used in invoking the application. The parent application 13 may also identify, in the field 116 of the invoke application request, a callback routine, within the parent application 13, which the parent-child interface 15 should call when the child application 14 acknowledges its startup. In response to the request, the parent application's parent-child interface 15 generates an invoke application message for transfer to the system manager 20 to enable it to invoke the requested application. The parent-child interface 15 provides, in field 115, a handle identifying the link to the child application 14 to be generated.

The system executive 20 receives the invoke application message from the parent-child interface 15. In response, the system executive 20 searches for the file identified in the invoke application request, establishes a process context within the digital data processing system for the image and initiates its execution as child application 14 (step 52). The child application 14 then initializes itself and processes its startup routine, in a similar manner as described above (step 53), in the process initializing its child-parent interface 16. At the end of the startup routine, the child application 14 issues an acknowledgement request 120 (FIG. 3C) to its child-parent interface 16, including the name of the parent application in field 121, an action handle identifying the completed action in field 122, and status information in field 123. The status information comprises an invocation status value that indicates whether the child application 14 successfully processed its startup routine and is in condition to begin processing, to enable it to generate an acknowledgement message.

The child-parent interface 16 transmits the acknowledgement message, including the invocation status value, to the parent's parent-child interface 15, which, in turn, issues a request to the callback routine that the parent application 14 had identified in the invoke application request (field 116, FIG. 3B). The parent application 13 uses the invocation status value in determining whether the child application 14 is in condition to perform processing for it in one or more processing sessions. If not, the parent application may perform selected error recovery operations, such as notifying an operator or terminating the child application 14 and attempting to invoke it again.

The child application 14, after initializing and processing its startup routine, generates a set action request 130 (FIG. 3D) identifying action routines which may be called by the parent application (step 54). The action routines may, for example, comprise routines which enable the child application 14 to initialize, start or terminate a session or to terminate execution, to identify input or output data files, to transfer data dynamically, and to perform predetermined processing operations.

The set action request includes an application handle field 131 in which the child application 14 can insert a value controlling use of actions specified in an action list 133 as described below. In this operation, the child application 14 includes a action list 133 comprising an array of action items 134(*i*). Each action item includes a routine identification field 135 for storing the identification of a routine, an routine address field 136 for storing the call address in the child application 14 through which the routine can be called, and a field 137 for receiving any other calling information which may be required. A count value in field 138 identifies the number of action items 134 in the action list 133. A flag in field 132 controls whether the action list 133 is to supplement or over-write action lists which may have previously been provided through a set actions request 130.

In addition, the contents of the application handle field 131 control whether the action list 133 is to be used for communications with all other applications or only for a specified application. In particular, the child application may load a value into field 131 corresponding to the application handle returned following processing of the startup request. In that case, the action routines in the action list are default routines. On the other hand, if it loads a different value into the field 131, the value identifies an application with which the routines are to be used. In that case, the routines are called only for communications with that application.

After the child application has started successfully, the parent application 13 may initiate processing by the child application 14 in a series of one or more sessions. The parent application 13 first generates a session initialization request 140 (step 55) identifying, in field 141, the child application 14 and providing an action identifier, for the session initialization request, in field 143. In addition, the session initialization request can identify a callback in field 142 to be used on receiving the status of the session initialization request which the child application may use to indicate status of its processing during the subsequent session. In response to the session initialization request, the parent-child interface 15 generates a message for transfer to the child-parent interface 16 of the child application 14 to execute the operation identified in the session initialization request.

The child application's child-parent interface 16 receives the session initialization message from the parent-child interface 15 and calls the child application's session initialization routine, which is one of the actions which the child application 14 identified to its child-parent interface 16 during the set actions request. In processing the session initialization routine, the child application 14 initializes itself to perform a processing operation. In that operation, the child application 14 may, for example, adjust its resources, such as its address space, so as to be able to perform an operation.

When the child application 14 finishes processing of the session initialization routine, it generates status information indicating whether it successfully processed the routine, which it transfers to its child-parent interface 16. In response, the child-parent interface 16 generates a message which it transfers to the parent application's parent-child interface 15, which, in turn, calls the callback identified in the parent application's session initialization request, including the status information. If the status information indicates that the child application 14 successfully processed the session initialization routine, the parent application 14 generates a data transfer request identifying the data to be transferred (step 57).

In one particular embodiment, the parent application 14 may transfer data in two ways. If the data is maintained in a file in the digital data processing system, the parent application 13 generates a set input file request 150 (FIG. 3F) that identifies the file. The set input file request includes in field 151 the name of the application of the child application 14, and in field 152 the name of the file containing data to be transferred, and may include in field 155 a callback routine to be called in the parent application 13 in response to an acknowledgement from the child application 14. In addition, the set input file request includes two flags which control creation by the child application 14 of input files, permitting the child application 14 to create an input file for data which may be provided from another source, including, for example, the operator. In particular, the parent application's set input file request includes a FILE_CREATE flag 153 indicating that the child application 14 is to create a new file, with the indicated file name, even if a file with the indicated file name exists, and a CREATE_IF_NOT_EXIST flag 154 which indicates that the child application 14 is to create a new file with the indicated name if a file with that name does not already exist. The parent-child interface 15 transmits a message including the request to the child application 14 through its child-parent interface 16. Upon receipt of the message, the child-parent interface 16 may obtain the data from the identified file for processing, or establish a file with the indicated name depending on the condition of the FILE_CREATE flag 153 and CREATE_IF_NOT_EXIST flag 154.

Alternatively, if the data is maintained in one or more buffers, the parent application 13 generates a send data request 160 (FIG. 3G), identifying a list of data items to be transferred. The send data request 160 includes an application identifier identifying the application to which the data is being transferred, in this case the child application 14. The send data request 160 also includes a send list 162 including one or more data items 163, a send count 170 identifying the number of data items in the send list 172, an action identification in field 172 identifying the send data request, and may include a callback routine to be called in the parent application 13 in response to an acknowledgement from the child application 14.

Each data item 163 in the send list 160 includes number of fields for specifying the buffer. In particular, a buffer name field 164 identifies a name for a buffer, an address field 167 identifies the beginning of the buffer and a buffer size field 168 identifies the length of the buffer. In addition, each data item 163 includes a format information field 166 that identifies the data type and format of the data in the buffer and the buffer address. Further, a data item may include a sequence number in field 169 identifying the data item within a sequence of related data items and a set of flags indicating whether the data item is at the end of the sequence.

In addition, a group of flags in field 165 of a data item further specifies the data defined thereby. Flags indicate, for example, whether data is supplied in multiple buffers, each identified by a data item 163. In addition, data belonging to a particular group of data may be transmitted in a plurality of buffers and each data item pointing thereto may include a flag identifying a series of data items as being related to the same group. In response to the send data request, the parent application's parent-child interface 15 generates a message, including the send data request, to the child application's child-parent interface 16. The child-parent interface 16, in turn, transfers the request in the message to the child application 14.

Upon receiving either a data transfer request message or a send data request, the child application's child-parent interface 16 calls a routine, as identified in the child application's action list, to enable it to proceed to process the request. In particular, with respect to a data transfer request, the child application 14 proceeds to obtain the data from the file identified by the data transfer request message, or, depending on the conditions of the FILE_CREATE and CREATE_IF_NOT_EXIST flags, to create a new file with the indicated file name. With respect to a send data request message, the child application 14 proceeds to obtain the data from the series of buffers identified by the send data request (step 60).

If the child application 14 is successful in obtaining access to the identified data, it generates a status indication, which its child-parent interface 16 loads into an acknowledgement message for transmission to the parent application's parent-child interface 15. Upon receipt of the acknowledgement message, the parent application's parent-child interface 15 calls a callback which the parent application 14 had specified in the set input file request or the send data request.

If the child application successfully performs the operations in connection with processing of the set input file request or the send data request, the parent application 13 then may generate an execute session request 180 (FIG. 3H) to enable the child application to perform an operation, in particular the core function performed by the child application 14. For example, if the child application 14 is a program that generates data defining a chart in response to tabular input data, the parent application 13 uses the execute session request to enable the child application to generate the chart data in response to data in the file or buffers identified in the set input file request or the send data request, or obtained from the operator. In the execute session request, the parent application 14 provides in field 181 the identification of the child application 14, an action identification in field 183 to identify the execute session request, and may also provide a callback routine to be called in the parent application 13 in response to an acknowledgement from the child application 14, and a handle value identifying the particular request. The parent application's parent-child interface 15 then generates a message including the execute session request, which it transmits to the child-parent interface 16. The child-parent interface 16, in turn, transmits the execute session request message to the child application 14.

Upon receiving the execute session request (step 62), the child application 14 begins its session by initiating its core processing operation (step 63). In that operation, the child application 15 displays its user interface and begins processing the data identified in either the data transfer request command or the send data request. During this processing, the operator may also control processing by issuing commands to the child application 15, and may also specify alternate or additional data files, or additional items of data, to use during processing. If an operator specifies an alternate file to be used in storing data processed during a session, the child application 14 may notify the parent application by generating a set new input file request 190 (FIG. 3I) identifying the file containing the input data as identified by the user. In the set new input file request, the child application 14 provides the identification of the parent application in field 191, the new file name in field 192, and may include a callback routine to be called in the child application 14 in response to an acknowledgement from the parent application 13. In response, the child-parent interface 16 generates a message identifying the new input file, which it transfers to the parent-child interface 15. The parent-child interface 15, in turn, relays the identification of the new input file in a message to the parent application 13.

At some point the child application 14 will finish its operation. At that point, the child application generates an acknowledgement request 120 (FIG. 3C), identifying the parent application, the completed operation, and the status, which it transfers to its child-parent interface 16. In response, the child-parent interface 16 generates a message to transfer the operation identification and the status to the parent application's parent-child interface 15, which, in turn, relays the information to the parent application.

In addition, upon finishing the operation, the child application 14 stores the processed data in a file and generates a set final output file request 200 (FIG. 3J) to notify the parent application 13. The set final output file request includes, in field 201, the name of the parent application 14, the name of the file in field 202, format information of the data in the file in field 203, and may include in field 204 a callback routine to be called in the child application 13 in response to an acknowledgement from the parent application 14. The child application's child-parent interface 16 generates a message in response to the set final output file request. The parent application's parent-child interface 15 receives the message, and calls a routine in the parent application 13 for processing the request. The parent application 13 generates an acknowledgment request 120 (FIG. 3C) to enable its parent-child interface 15 to transmit an acknowledgement message to the child application's child-parent interface 16 to acknowledge the receipt of the set final output file request. Upon receipt of the acknowledgement from the parent application 14, the child application's child-parent interface 16 calls a callback routine in the child application 14 that was identified in the set final output file request 200.

As an alternative to using the set final output data request to transfer result data to parent application 14, the child application 14 may store the processed data in one or more buffers and instead generate a send data request 160 (FIG. 3G), substantially as described above, to initiate transfer of the result data to the parent application through the buffers. In response to either the set final output file request 200 or the send data request 160, the parent application 14 can retrieve the processed data from the file or buffers as necessary in its subsequent processing.

After the child application 14 has stored the data in the respective file or buffers, it generates a session exit request 210 (FIG. 3K), which is transferred by means of messages through the child-parent interface 16 and parent-child interface 15, respectively, to the parent application 13 (step 64). The session exit request 210 includes, in field 211, the identification of the parent application 13 and may include in a field 212 a callback routine to be called in the child application 14 in response to an acknowledgement from the parent application 13. In response to the session exit request 210, the child application's child-parent interface 16 generates a message for transfer to the parent-child interface 15, which provides the request to the parent application 13. The parent application, in turn, generates an acknowledgement request 120 (FIG. 3C) including a status indication acknowledging the request. The parent application's parent-child interface 15 returns the status indication, in an acknowledgement message, to the child application's child-parent interface 16, which, in turn, calls the callback routine identified in the session exit request generated by the child application 14. In that routine, the child application 14 then removes its user interface, if it provided one in step 63, and waits in the background for the parent to initiate operations thereby again in subsequent sessions. In this, the digital data processing system effectively maintains the process context including the child application 14, but deschedules it until the parent application 13 requires another session as described in connection with steps 65 and 66.

After the parent application 14 receives the session exit request, it sequences to a loop including steps 65 and 66. In those steps, the parent application 13 performs other processing operations, which may use the data, in the file or buffers returned by the child application 14 connection with the session exit operation in step 64. In addition, the parent application 13 determines whether it should enable the child application to terminate operations (step 65, which may occur in response to a command from an operator, provided either directly to the parent application 13 or indirectly through, for example, the parent application's relative parent. If the parent application does not receive a command to terminate the child application, it also, during its processing, determines whether it needs additional processing by the child application 14 (step 66) and, if not, continues processing, and also returns to step 65.

At some point the parent application may determine, in step 66, that it needs additional processing by the child application 14. The additional processing by the child application 14 may, as was the case with the first session described above, be in response to a direct command from an operator, to a command received from a relative parent, or from another source. In that case, the parent application 13 returns to step 55 to initiate another session with the child application 14.

Further, at some point the parent application 13 may determine, in step 65, that it may terminate the child application 14. This may also be in response to a command from an operator directly to the parent application 13, or in response to a command from a relative parent of the parent application 13. The parent application 13 generates a terminate application request 220 (FIG. 3L), including an application identifier in field 221 identifying the child application and an action identifier in field 223 identifying the termination request. The terminate application request 220 may also include a callback routine to be called in the parent application 13 in response to an acknowledgement from the child application 14. The parent-child interface 15 receives the terminate application request 220, and generates a message for transfer to the child application's child-parent interface 16. The child-parent interface 16 transfers the request to the child application 14. The child-parent interface 16 uses the child application's action list to identify the child application's termination routine, which it calls. The child application generates a status value indicating whether the termination will be successful, which the child-parent interface 16 transfers in a message to the parent application's parent-child interface 15. The parent-child interface 15 may then call the callback routine specified in the terminate application request. Contemporaneously, the child application enables the system executive 20 to eliminate the child application's process context in the digital data processing system.

In one specific embodiment, the parent application 13 and the child application 14 may also generate other requests, which are generally passed therebetween by messages between the parent-child interface 15 and the child-parent interface 16. In the case of additional requests generated by the parent application 13, the additional requests may control operations of the child application, and in the case of the additional requests generated by the child application 14 the additional requests may indicate changes to its operations as specified by an operator during a session.

Figure 3M:
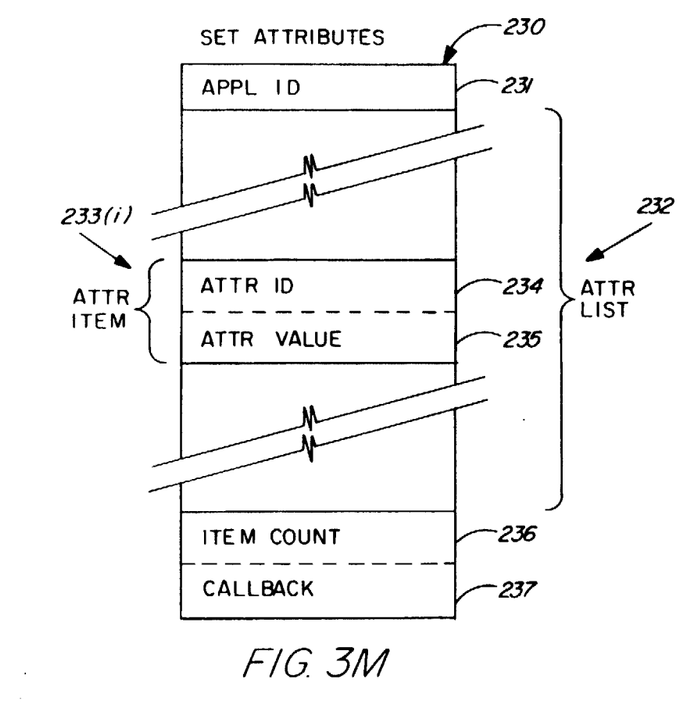
Figure 3N:
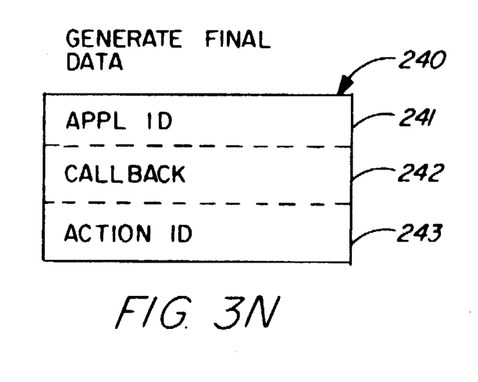
Figure 3O:
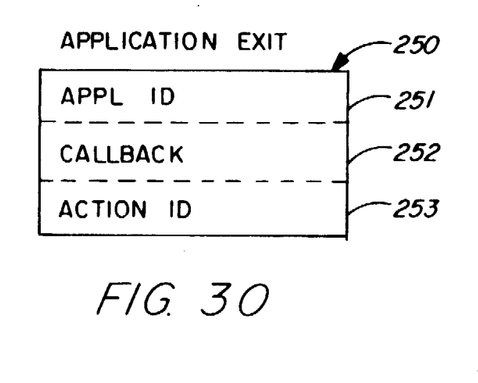
Figure 3P:
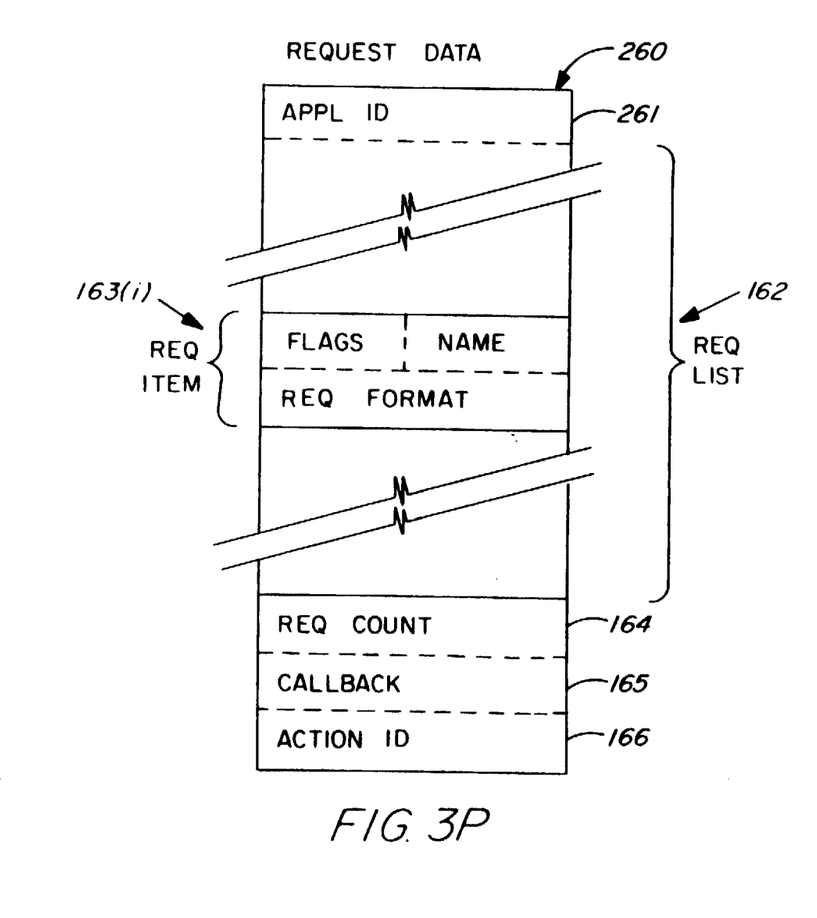

The parent application 13 may, for example, establish selected processing parameters by generating a set attributes request 230 (FIG. 3M). For example, if the parent application 13 is an application that generates and processes documents, and the child application 14 is one that generates images, the parent application 13 may initiate a session with the child application 14 to enable it to generate image data for use as a figure in a document. The parent application 13 may notify the child application 14 of selected aspects of the figure, including the size of the figure, colors, and so forth, to be generated thereby by the set attributes request. The set attribute request 230 includes an application identifier in field 231 identifying the child application 14, and an attribute list 232 including, in each of a plurality of attribute items 233(i), the identification of a particular attribute in field 234 and the respective value for the attribute in field 235. The set attribute request also includes an item count in field 236 and may include a callback routine to be called in the parent application 13 in response to an acknowledgement from the child application 14.

In that same illustrative document processing application, the application, as a parent application 13, may enable a child application 14 to generate a file comprising a final form document, that is, a file containing documentary data in final format for display or printing, using a particular request, namely, a generate final data request 240 (FIG. 3N), rather than an execute session request. In the generate final data request 240, the parent application 14 provides in field 241 the identification of the child application, an action identifier in field 243, and may include in field 242 a callback routine to be called in the parent application 13 in response to an acknowledgement from the child application 14. In response to the generate final data request, the parent application's parent-child interface 15 generates a message for transfer to the child application's child-parent interface 16, which, in turn, enables the child application to perform its core operation, as described above, but without raising a user interface. The child application 14 effectively runs in the background in response to a generate final data request. When the child application 14 has finished the operation, it generates an acknowledgement request 120 (FIG. 3C) which enables its child-parent interface 16 to generate an acknowledgement message, which is transmitted to the parent application's parent-child interface 15. In response to receipt of an acknowledgement message, the parent-child interface 15 calls a callback routine specified in the parent application's generate final data request.

As described above, a child application 14 will, in response to an execute session message or a generate final data message, perform its core operations during a session, and generate an acknowledgement request 120 indicating that it has completed processing after finishing the operations. In some cases, the child application 14 may be delayed in finishing the required operations and transmitting the acknowledgement to the parent application, and in those cases it may generate a defer action acknowledgement request, which is substantially similar to the acknowledgement request 120, which may notify the parent application that it in fact received the execute session message or generate final data message, and that it would be delayed in generating the indication that the processing has been completed. Its child-parent interface 16 subsequently transmits a corresponding message to the parent-child interface 15 of the corresponding parent application 13, thereby notifying it of the delay. The parent application 13 then may reset any time-outs it may be maintaining in connection with responses from the child application 14.

As described above, the parent application 13 may enable the child application to terminate. The child application 14 may also initiate its termination by issuing an application exit request 250 (FIG. 3O), which includes a field 251 that identifies the parent application, an action identification in field 253, and may also include in field 252 a callback routine to be called in the child application 14 in response to an acknowledgement from the parent application 13. The child application's child-parent interface 16 generates a message for the application exit request, which it transmits to the parent-child interface 15 of the identified parent application. The parent application may transmit a status value indicating whether the child application may exit, which the parent-child interface 15 transfers in an acknowledgement message. The child application's child-parent interface 16 receives the acknowledgement message, and transfers the status indication to the child application by calling the specified callback routine. If the child application may exit, the child application notifies the system executive 20, which terminates the child application.

As noted above, the parent application 13 may be a relative parent of multiple child applications 14. Requests generated by the parent applications 13 and child applications 14 all include a handle value that specifies the particular communications link, that is, the parent-child relationship for the application that generated the request and the particular application to receive the request. A parent application 13 and a child application 14 may determine the identification of the other application associated with the communications link by means of a get application name request. The application's interface, that is, the parent-child interface 15 in the case of a request for a child application identification by the parent application 13, and the child-parent interface 16 in the case of a request for a parent application identification by the child application 14, returns the identification of the other application to the requesting application. Each interface may, for example, maintain tables of handle values and application identifications, for use in transmitting requests generated by its application to the proper application, which it may use in identifying the application associated with a particular handle value in response to a get application name request from its associated application.

Figure 3Q:
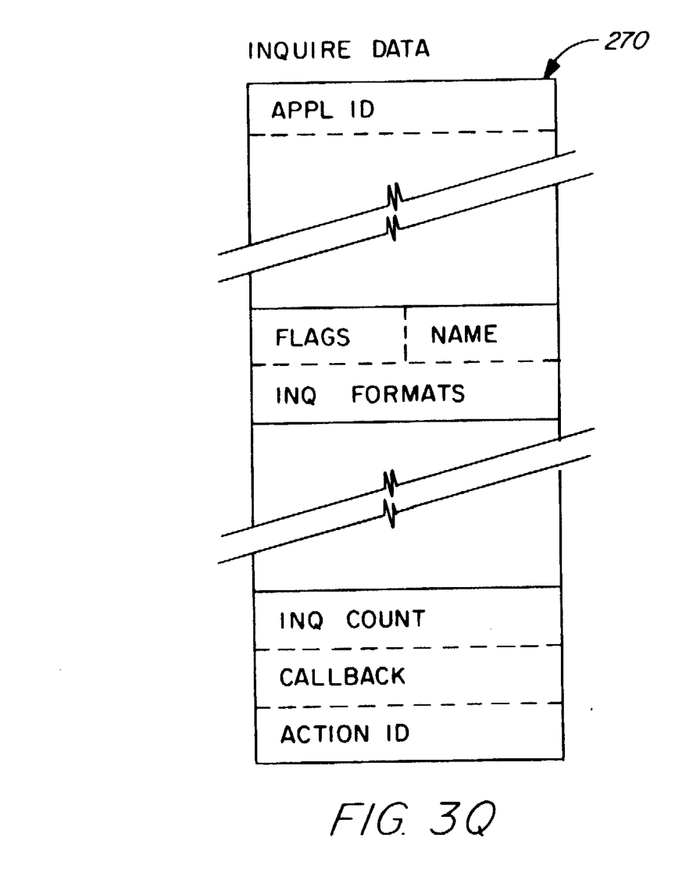

As also described above, an application may transfer data, organized into one or more buffers, by means of a send data request, with the send data request identifying the buffers that contain the data to be sent. In addition, an application may generate a request data request 260 (FIG. 3P) and an inquire data request 270 (FIG. 3Q). The structures of these requests are similar to that of the send data request 160 (FIG. 3G) and will not be described in detail. The request data request 260 enables an application, either a parent application 13 or a child application 14, to request the other application to transmit items of data which are specified in the request. The other application then transmits the data to the requesting application by the send data request 160. The inquire data request 270 enables an application, either a parent application 13 or a child application 14, to inquire of the other whether it can provide data items specified in the request, and, if so, the type and format of the data items. The application receiving the inquire data request does not actually supply any data in response to an inquire data request 270.

Figure 3R:
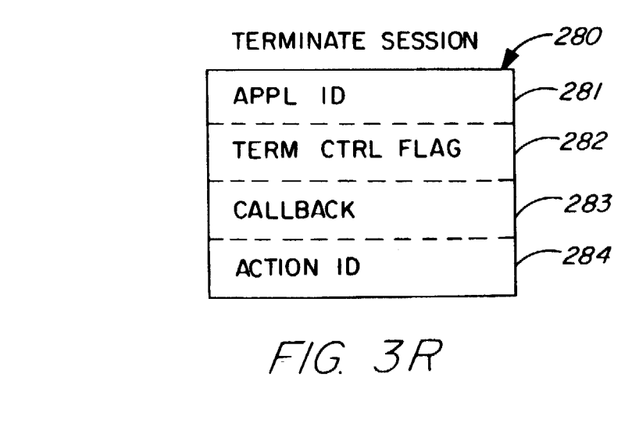
Figure 3S:
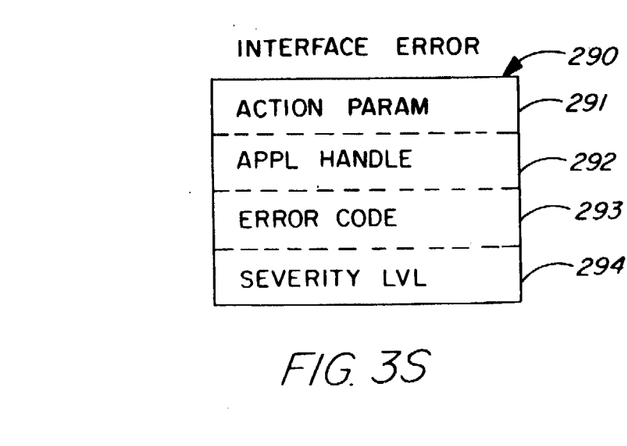

As described above, the parent application 13 will normally allow the child application 14 to complete a session, that is, to perform its core operation. Situations may develop in which the parent application 13 determines that the child application 14 should terminate a session, and in response the parent may generate a terminate session request 280 (FIG. 3R). The terminate session request 280 includes in field 281 an application identifier identifying the child application 14, an action identifier identifying the request and may include a callback routine to be called in the parent application 13 in response to an acknowledgement from the child application 14. In addition, the request includes a termination control flag 282, which may indicate whether the child application 14 is to save the results of its processing up to the point it is notified to terminate the session. The parent application's parent-child interface 15 generates a message in response to the request, which it transmits to the child application's child-parent interface 16. The child-parent interface 16 uses the action list to identify the terminate session routine, which it calls to enable the child application to process the request. Upon terminating the session, the child application 14 generates an acknowledgement request 120 enabling its child-parent interface 16 to generate an acknowledgement message. Upon receipt of the acknowledgement message, the parent application's parent-child interface 15 calls the callback specified in the terminate session request.

It will be appreciated that, in some circumstances the respective parent-child interface 15 and child-parent interface 16 may encounter errors, for example, in transmitting and receiving messages therebetween during a session. In response, both may generate error indications for their respective applications, which may process them as necessary to determine whether to continue a session. An interface error notification 290 is depicted in FIG. 3S, and includes an action parameter field 291 which contains a value previously specified by the application in the action list provided to the interface in the set action request. An application handle 292 specifies the application with respect to which the error occurred, that is, the application to which the interface was attempting to transmit a message or from which it was attempting to receive a message, when it identified the error. In addition, an error code field 293 identifies the type of error, and a severity level field 294 identifies the severity of the error, that is, whether the error is fatal to subsequent operations.

In one specific embodiment, a parent-child interface 15 and a child-parent interface 16 comprise one set of routines that are linked with both the parent application 13 and the child application 14. Thus some routines, such as those for responding to requests and generating messages, or for receiving messages and generating callbacks, which are common to the parent-child interface 15 and child-parent interface 16 are only provided once in that embodiment. For example, as noted above, the parent-child interface 15 and child-parent interface 16 both may process a startup request, and, in that embodiment, only one routine need be provided. In addition, only one action acknowledgement routine or defer action acknowledgement routine need be provided to transmit status information from an application to its relative child applications and to its relative parent application.

The parent-child interface 15 and the child-parent interface 16 thus facilitate processing operations by the child application 14 in response to processing requests from the parent application 13 in a series of processing sessions, without requiring the parent application 13 to terminate to enable processing by the child application 14.

Furthermore, the interfaces 15 and 16 enable the parent application 13 to iteratively enable processing by the child application 14 in a series of sessions, without requiring termination of the child application between sessions. Invoking an application may take a considerable amount of time, which may be saved between sessions since the process context of the child application 14 is maintained in the digital data processing system between sessions.

In addition, the invention provides a uniform interface between the parent and child applications, through the respective parent-child interface 15 and child-parent interface 16, effectively isolating them from possibly diverse communications requirements of different operating systems, such as pipes, mailboxes, and so forth. Sets of routines comprising the interfaces 15 and 16 may be provided, as library routines, for selected operating systems, which may be linked to the respective parent application 13 or child application 14 during a linking operation to provide a parent 11 or child 12. Since the call structure, depicted in FIGS. 3A through 3S, which the applications 13 and 14 use to enable operations by the parent-child interface 15 and child-parent interface 16, is uniform across operating systems, the programmer developing the applications 13 and 14 do not need to provide applications which have call structures that are specific or unique to the particular operating systems.

Furthermore, the programmer developing the applications 13 and 14 does not need to be apprised of details of communications which may be required if they are moved, for example, from one operating system to another, since the actual message transfers are handled by the parent-child interface 15 and child-parent interface 16. Indeed, the parent and child applications may be processed on computers using different operating systems, or on different computers in, for example, a distributed digital data processing system. Messages passed between the parent-child interface 15 and the child-parent interface 16 may be by any conventional interprocess communication mechanism, including a procedure call mechanism or a remote procedure call mechanism, or through messages transferred over a network. Alternatively, in one specific embodiment, used in connection with the X-Windows display system, the communications are through X-events provided by the X-Windows display system.

It will be appreciated that the various portions described above may all comprise special-purpose apparatus, or they may comprise computer programs executed by a general purpose computer.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A method of operating a digital computer system in which a first process in said digital computer system invokes a second process in said digital computer system, said digital computer system having a system executive for maintaining a plurality of current process contexts and for scheduling and de-scheduling execution of processes, each of said processes having a respective one of said current process contexts, said method comprising the steps of:

(a) said first process transmitting to said system executive an invocation request for invocation of said second process, said invocation request including a first callback parameter identifying a first entry point of said first process;

(b) said system executive receiving said invocation request from said first process, and in response, creating a process context for said second process and scheduling said second process for execution with said first callback parameter; said second process being executed with said first callback parameter in response to being scheduled by said system executive for execution with said first callback parameter; said second process returning a first acknowledgement to said first entry point of said first process, said first acknowledgement including an invocation status indicating whether said second process is in a condition for beginning processing for said first process;

(c) when said invocation status indicates that said second process is in a condition for beginning processing for said first process, said first process responding to said first acknowledgement by sending an initialize session request to said second process; said initialize session request including a second callback parameter identifying a second entry point of said first process;

(d) said second process responding to said initialize session request by adjusting address space for performing data processing for said first process, and returning a second acknowledgement to said second entry point of said first process, said second acknowledgement including an initialization status indicating whether said second process has adjusted its address space for performing said data processing for said first process;

(e) when said initialization status indicates that said second process has adjusted its address space, said first process responding to said second acknowledgement by sending a data transfer request to said second process, said data transfer request including identification of data to be transferred from memory to said second process, said data transfer request also including a third callback parameter identifying a third entry point of said first process;

(f) said second process responding to said data transfer request by attempting to access said data in said memory, and returning a third acknowledgement to said third entry point of said first process, said third acknowledgement including a data transfer status indicating whether said data in said memory is successfully accessed by said second process, and when said data in said memory is successfully accessed by said second process, said second process obtaining said data from said memory;

(g) when said data transfer status indicates that said second process has successfully accessed said data in said memory, said first process responding to said third acknowledgement by sending an execute session request to said second process, said execute session request identifying at least one operation to be performed by said second process in connection with said data, said execute session request including a fourth callback parameter identifying a fourth entry point in said first process;

(h) said second process responding to said execute session request by performing said at least one operation in connection with said data to modify said data, transmitting the modified data to said first process, and transmitting a session exit request to said fourth entry point of said first process upon completion of performance of said at least one operation;

(i) in response to said session exit request, said first process deciding whether to either request additional processing by said second process or to request termination of said second process; and when deciding to request additional processing by said second process, sending a request for additional processing to said second process, and when deciding to terminate said second process, sending a termination request to said second process; and (j) said second process performing said additional processing upon receiving said request for additional processing, and terminating upon receiving said termination request.

2. The method as claimed in claim 1, wherein said request for additional processing includes another initialize session request.

3. The method as claimed in claim 1, wherein said second process generates an action item list in response to said invocation request, said action item list including action items selectable by said first process and a respective call address in said second process for each of said action items; said initialize session request includes an identification of one of said action items to initialize said second process to receive a session request; said step (d) includes using said action item list to find the respective call address for said one of said action items and calling the respective call address for said one of said action items; said execute session request includes an identification of another one of said action items to select said at least one operation to be performed by said second process in connection with said data; and said step (h) includes using said action item list to find the call address for said another one of said action items and calling said second process at the call address for said another one of said action items.

4. The method as claimed in claim 1, wherein said identification of data to be transferred indicates a file name, and said data transfer request further includes control information indicating whether or not said second process is to create a new file with the same file name, even when a file with the indicated file name already exists, and indicating whether or not said second process is to create a new file with the indicated file name when a file with said file name does not exist, and wherein said second process selectively creates a new file in accordance with said control information.

5. The method as claimed in claim 4, wherein said control information consists of a "file create flag" indicating whether or not said second process is to create a new file with the same file name, even when a file with the indicated file name already exists, and a "create if not exist" flag indicating whether or not said second process is to create a new file with the indicated file name when a file with said file name does not exist.

6. The method as claimed in claim 1, wherein said identification of data to be transferred includes a buffer descriptor identifying a buffer base address and a buffer length.

7. The method as claimed in claim 1, wherein said identification of data to be transferred includes a list of a plurality of buffer descriptors; each of said buffer descriptors identifying a buffer base address, a buffer length, and a sequence indicator identifying a buffer data item within a sequence of related data items.

8. The method as claimed in claim 1, wherein said one of said operations includes storing processed data in an output object and transmitting an output object message to said first process, said output object message identifying the output object.

9. The method as claimed in claim 8, wherein said output object comprises a file identified by a file name, and said output object message indicates the file name.

10. The method as claimed in claim 8, wherein said output object comprises a buffer, and said output object message identifies a base address and a length of said buffer.

11. The method as claimed in claim 8, wherein said output object comprises a plurality of buffers, and said output object message identifies a list of buffer descriptors, each of said buffer descriptors identifying a respective one of said plurality of buffers, and each of said buffer descriptors identifying a base address, a length, and a sequence number identifying a buffer data item within a sequence of related data items.

12. A method of operating a digital computer system in which a first process in said digital computer system invokes a second process in said digital computer system, said digital computer system having a system executive for maintaining a plurality of current process contexts and for scheduling and de-scheduling execution of processes, each of said processes having a respective one of said current process contexts, said method comprising the steps of:

(a) said first process transmitting to said system executive an invocation request for invocation of said second process;

(b) said system executive receiving said invocation request from said first process, and in response, creating a process context for said second process and scheduling said second process for execution; said second process being executed in response to being scheduled by said system executive for execution; said second process generating an action item list including action items indicating operations of said second process that are selectable by said first process, said action item list further including a respective call address in said second process for each of said action items, and said second process returning an acknowledgment of invocation to said first process;

(c) after receiving said acknowledgement of invocation from said second process, said first process sending a first action request to said second process to perform a first operation of a first one of said action items, said first action request including an identification of a first one of said action items;

(d) said second process responding to said first action request by using said action item list to find the respective call address for said first one of said action items and calling the call address for said first one of said action items to perform said first operation, and transmitting an acknowledgement of completion to said first process upon completion of performance of said first operation;

(e) in response to said acknowledgement of completion, said first process deciding whether to either request additional processing by said second process or to request termination of said second process; and when deciding to request additional processing by said second process, sending a second action request to said second process for processing of a second operation of a second action item, said second action request including an identification of a second one of said action items, and when deciding to terminate said second process, sending a termination request to said second process; and (f) said second process performing said second operation of said second action item upon receiving said second action request, and terminating upon receiving said termination request.

13. The method as claimed in claim 12, wherein said operations of said action items include a data transfer operation for transferring data from memory to said second process; said first process sends a data transfer action request to said second process for said data transfer operation, said data transfer action request including identification of said data to be transferred from said memory to said second process; and wherein said second process responds to said data transfer action request by obtaining from memory said data to be transferred from said memory to said second process.

14. The method as claimed in claim 13, wherein said identification of data to be transferred indicates a file name, and said data transfer request further includes control information indicating whether or not said second process is to create a new file with the same file name, even when a file with the indicated file name already exists, and indicating whether or not said second process is to create a new file with the indicated file name when a file with said file name does not exist, and wherein said second process selectively creates a new file in accordance with said control information.

15. The method as claimed in claim 14, wherein said control information consists of a "file create flag" indicating whether or not said second process is to create a new file with the same file name, even when a file with the indicated file name already exists, and a "create if not exist" flag indicating whether or not said second process is to create a new file with the indicated file name when a file with said file name does not exist.

16. The method as claimed in claim 13, wherein said identification of data to be transferred includes a buffer descriptor identifying a buffer base address and a buffer length.

17. The method as claimed in claim 13, wherein said identification of data to be transferred includes a list of a plurality of buffer descriptors; each of said buffer descriptors identifying a buffer base address, a buffer length, and a sequence indicator identifying a buffer data item within a sequence of related data items.

18. The method as claimed in claim 12, wherein said operations of said action items include storing processed data in an output object and transmitting an output object message to said first process, said output object message identifying the output object.

19. The method as claimed in claim 18, wherein said output object comprises a file identified by a file name, and said output object message indicates the file name.

20. The method as claimed in claim 18, wherein said output object comprises a buffer, and said output object message identifies a base address and a length of said buffer.

21. The method as claimed in claim 18, wherein said output object comprises a plurality of buffers, and said output object message identifies a list of buffer descriptors, each of said buffer descriptors identifying a respective one of said plurality of buffers, and each of said buffer descriptors identifying a base address, a length, and a sequence number identifying a buffer data item within a sequence of related data items.

* * * * *